United States Patent [19]

Pomerene et al.

[11] Patent Number: 4,774,654
[45] Date of Patent: Sep. 27, 1988

[54] APPARATUS AND METHOD FOR PREFETCHING SUBBLOCKS FROM A LOW SPEED MEMORY TO A HIGH SPEED MEMORY OF A MEMORY HIERARCHY DEPENDING UPON STATE OF REPLACING BIT IN THE LOW SPEED MEMORY

[75] Inventors: James H. Pomerene, Chappaqua, N.Y.; Thomas R. Puzak, Cary, N.C.; Rudolph N. Rechtschaffen, Scarsdale; Kimming So, Pleasantville, both of N.Y.

[73] Assignee: International Business Machines Corporation, Armonk, N.Y.

[21] Appl. No.: 685,527

[22] Filed: Dec. 24, 1984

[51] Int. Cl.⁴ .................. G06F 12/08; G06F 12/12
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,928,857 | 12/1975 | Carter | 364/200 |
| 4,370,710 | 1/1983 | Kroft | 364/200 |
| 4,437,155 | 3/1984 | Sawyer et al. | 364/200 |
| 4,464,712 | 8/1984 | Fletcher | 364/200 |
| 4,490,782 | 12/1984 | Dixon et al. | 364/200 |
| 4,533,995 | 8/1985 | Christian et al. | 364/200 |

Primary Examiner—Raulfe B. Zache
Assistant Examiner—Thomas C. Lee
Attorney, Agent, or Firm—Jack M. Arnold; Ilardi Terry J.

[57] ABSTRACT

A prefetching mechanism for a memory hierarchy which includes at least two levels of storage, with L1 being a high-speed low-capacity memory, and L2 being a low-speed high-capacity memory, with the units of L2 and L1 being blocks and sub-blocks respectively, with each block containing several sub-blocks in consecutive addresses. Each sub-block is provided an additional bit, called a r-bit, which indicates that the sub-block has been previously stored in L1 when the bit is 1, and has not been previously stored in L1 when the bit is 0. Initially when a block is loaded into L2 each of the r-bits in the sub-block are set to 0. When a sub-block is transferred from L1 to L2, its r-bit is then set to 1 in the L2 block, to indicate its previous storage in L1. When the CPU references a given sub-block which is not present in L1, and has to be fetched from L2 to L1, the remaining sub-blocks in this block having r-bits set to 1 are prefetched to L1. This prefetching of the other sub-blocks having r-bits set to 1 results in a more efficient utilization of the L1 storage capacity and results in a highter hit ratio.

10 Claims, 4 Drawing Sheets

A: LINE ID IN L1 CACHE
B: CONGRUENCE CLASS

A': BLOCK ID IN L2 CACHE
B': CONGRUENCE CLASS
C: LINE ID IN L2 BLOCK

A: LINE ID IN L1 CACHE
u: USE BIT

A': BLOCK ID IN L2 CACHE
$r_i$: REPLACEMENT BIT FOR LINE i

APPARATUS AND METHOD FOR PREFETCHING SUBBLOCKS FROM A LOW SPEED MEMORY TO A HIGH SPEED MEMORY OF A MEMORY HIERARCHY DEPENDING UPON STATE OF REPLACING BIT IN THE LOW SPEED MEMORY

TECHNICAL FIELD

The invention is in the field of data processing systems in which each processor has multiple levels of storage. More specifically, the invention is directed to increasing the speed of memory access time of the processor in the memory hierarchy.

BACKGROUND ART

In any data processing system, it is known that the speed of a processor (CPU) is much faster than its memory. Therefore, in order to allow a CPU to access data instantly and smoothly as possible, the storage of a CPU is usually organized with a hierarchy of heterogeneous devices: multiple levels of caches, main memory, drums, random access buffered DASD (direct access storage devices) and regular DASDs. Logically, any memory access from the CPU has to search down the hierarchy until the data needed is found at one level, then the data must be loaded into all upper levels. This feeding of data to the CPU, on a demand basis, is the simplest and most basic way of implementing a memory hierarchy.

U.S. Pat. No. 3,670,309 to G. M. Amdahl et al, sets forth a Storage Control System in a data processing system with two levels of storage, a cache and a main memory. This allows the CPU in the system to simultaneously interrogate the directories of both storages.

U.S. Pat. No. 4,290,103 to A. Hattori sets forth a management technique of caches in a multiprocessor system. Each CPU in the system has a local cache which shares a second level (L2) cache and main memory. Flags or Tags are used in the L2 cache to indicated the cache lines in L2 blocks. The purpose is to avoid the unnecessary invalidation of cache lines when a L2 block containing them is to be replaced from L2.

U.S. Pat. No. 3,670,307 to Arnold et al sets forth a system using two-level storage. A tag storage for the high-speed storage and a directory storage for the main storage are used. Desired data is retrieved from main storage and placed in high-speed storage. The tag indexing is updated. The tags contain a bit indicating that the corresponding address in high-speed storage has been fetched.

U.S. Pat. No. 4,344,130 to Fung et al discloses a block move instruction to execute a data transfer function in a microprocessor.

U.S. Pat No. 3,839,704 to Spencer discloses a computing system which utilizes a limited number of blocks of data in a backing store, which is part of a smaller buffer store. A dummy request is produced to transfer the block to the buffer store.

Most of the patents described above deal with concurrent access to multiple levels of storage from the CPU (s) in the system, or are managing the consistence of data movement between different levels of storage. Few are concerned with pre-loading of data between levels of storage in a memory hierarchy prior to the CPU(s) actually needing the data.

U.S. Pat. No. 3,292,153 to R. S. Barton et al sets forth a memory system which includes a low-speed memory and a high-speed cache. The memory system has an advance scan or 'program lookahead' feature that prefetches the next few instructions from the memory to the cache when the CPU is busy executing an instruction and the memory system is not busy.

U.S. Pat. No. 3,898,624 to R. J. Tobias sets forth an algorithm in a data processing system to prefetch the next sequential line from the main memory to a high-speed cache and to replace an existing line in the cache during prefetching.

According to the present invention, a prefetching mechanism for a memory hierarchy which includes at least two levels of storage is set forth. Let L1 and L2 be any two consecutive levels of storage, with L1 being a high-speed low capacity memory, and L2 being a low-speed high-capacity memory, with the units of L2 and L1 being blocks and sub-blocks respectively, with each block containing several sub-blocks in consecutive addresses. The mechanism is based on the fact the residence time of a block in L2 is in general much longer than that of any of its sub blocks in L1, and the CPU always has a tendency of referencing groups of data in close proximity with respect to one another, which in general is known as high spatial locality. During the residence time of a L2 block, the time should be long enough to determine how its sub-blocks are repeatedly fetched to L1 and then replaced. The present invention teaches a very simple but effective way to record the history of sub-block usage in the above sense, such that sub-blocks can be prefetched to L1 before they are actually needed by the CPU.

SUMMARY OF THE INVENTION

The object of the invention is to provide a simple but effective mechanism to prefetch data to a level of storage, say L1, from its immediate lower level, say L2, before the CPU actually requests the data. This prefetching is in addition to the demand fetching in a normal memory hierarchy and has the effect of reducing the delay in memory accesses which would otherwise occur on the demand fetches. The implementation of the invention requires, in the L2 directory, that each sub-block in a block is provided with an additional bit, called the r-bit which stands for the Replacement bit, which indicates that the sub-block has been loaded to L1 and subsequently Replaced from L1 to L2. The invention requires the replacement logic in L1 to send the sub-block address to L2 to update its r-bit whenever it is to be replaced. On a L1 sub-block miss, L2 can use the r-bits in the block containing the missed sub-block to prefetch the rest of sub-blocks which have been previously used by the CPU but replaced from L1. The prefetching results in a more efficient utilization of the L1 storage capacity and a reduction of the memory access time as well.

DESCRIPTION OF THE PREFERRED EMBODIMENT

Figure 1:
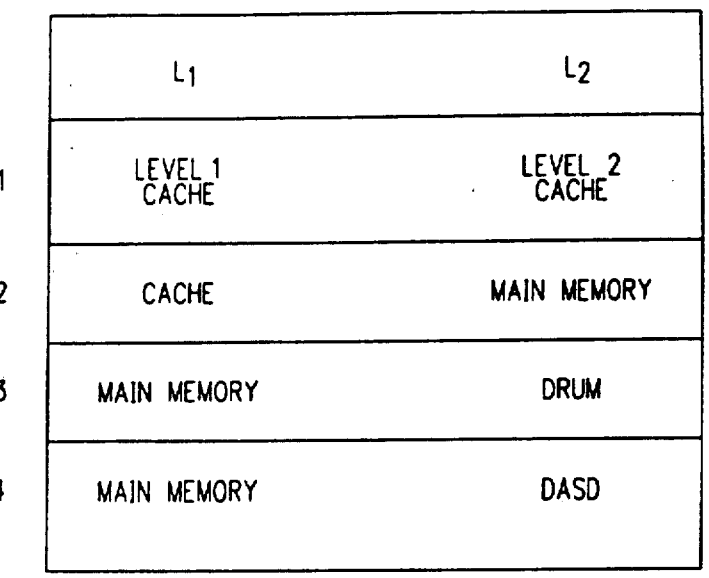
FIG. 1 is a table of examples of L1 and L2 memory levels in a regular memory hierarchy.

As shown in the table of FIG. 1, L1 and L2 can be referred to as any two consecutive levels of storage in the memory hierarchy of a computer stem. Although the invention can be applied to any consecutive levels, in order to facilitate the detailed description of the invention, assume that L1 and L2 are the Level One and Level Two caches, respectively.

Figure 2:
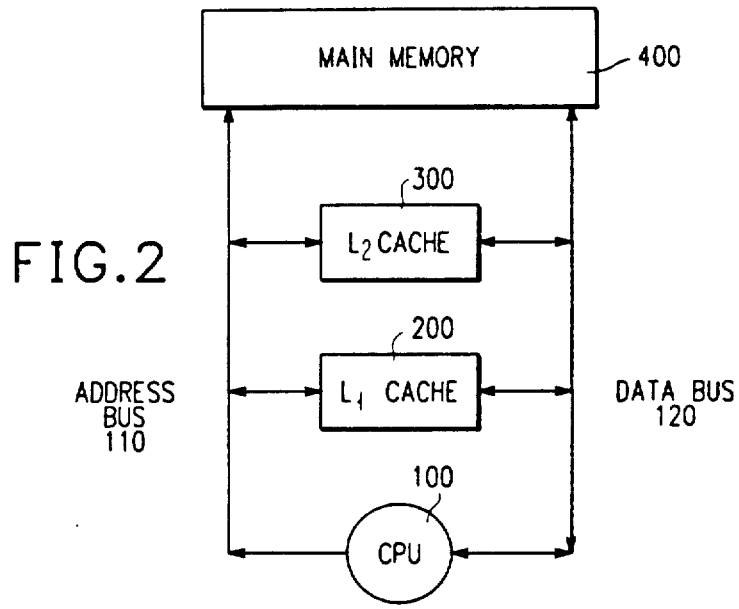
FIG. 2 is a block diagram of a computer system having a three level memory hierarchy, including a CPU, a L1 cache, a L2 cache and main memory.

FIG. 2 is a block diagram of a data processing system, which includes a Processor 100 and its three levels of memory hierarchy : A Level One (L1) cache 200, a Level Two (L2) cache 300, and main memory 400. The system is connected thru a single or multiple address buses 110 to transfer addresses of memory requests, and data buses 120 to transfer requested data. In general, any memory request, either a store or a fetch, is sent via the address bus 110 to the L1 cache, then to L2 cache, and then to the main memory. A search down the memory hierarchy terminates at a level where the requested data is found.

Before describing the detailed system operation, terms used in the invention are first defined. The size of a memory request, which is referred to as a number of bytes in the memory, is fixed and is called an access unit. Although the invention does not require a specific access unit, for convenience, it is assumed that all memory accesses are on a double-word (DW) basis. The storage unit of the L1 cache is called a Line which can hold a consecutive section of data in the memory. The L1 cache directory holds an entry for each line presently in the L1 cache. It also maintains a replacement order of the lines in the cache such that, when the cache is full and a line is moving in, the least-recently-used line is to be replaced. The storage unit of the L2 cache is called a block which is assumed to be many times bigger than a line in L1 cache. The line and block containing the current DW memory access are respectively called the accessed line and accessed block. A Full Block L2 cache, which moves whole blocks of data in and out of the cache on a cache miss, is the same as the L1 cache both in structure and operation.

There are two ways of maintaining the consistence of copies of data in both a cache and its next level of storage. In a Store-in cache, the latest copy of a changed line is only kept in the cache until the whole line is replaced from the cache to return to the next level. In a Store-thru cache, both the cache and its next level are keeping, from time to time, the latest copies of every piece of data changed by the processor. This requires that any store of data updates both the cache and the next level, but if the data is found in a store-in cache there is no need to update the next level. Again for convenience, assume a store-thru L1 cache and a store-in L2 cache for the remainder of the description. A detailed description of store-in caches and their replacement logic are depicted in U.S. Pat. Nos. 3,735,360 and 3,771,137, which are assigned to the assignee of the present invention. A detailed description of store-thru caches is described in an article by C. J. Conti entitled 'Concepts for Buffer Storage' published in the IEEE Computer Group News, March 1969, Page 9-13. Therefore, detailed descriptions of these devices is not set forth herein.

The implementation of the invention is based on any existing L1 and L2 cache design, and requiring minimal if any changes or new components in an existing configuration.

Figure 3:
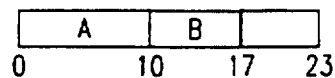
FIG. 3 is a diagram of a 24-bit memory address of the L1 cache under the assumed cache structures.
Figure 4:
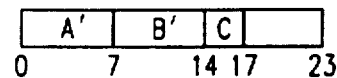
FIG. 4 is a diagram of a 24-bit memory address of the L2 cache under the assumed cache structures.

Assume that a memory access from the CPU 100 is in an address of 24 bits. The L1 cache has 128 columns (also called congruence classes, CC) 4 rows in each CC (called 4-way set associativity) and has a line size of 128 bytes. FIG. 3 illustrates how the fields in a 24-bit address of a memory access are used to address different components in the L1 cache. The L2 cache also has 128 CCs, is 4 way set associative and has a block size of 1024 bytes. Therefore an L2 block can hold 8 L1 lines in consecutive address. FIG. 4 due to the difference in size, how the same 24-bit address is broken down into similar fields for a L2 cache.

Figure 5:
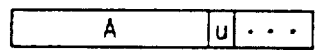
FIG. 5 is a diagram of an entry in the L1 cache directory.

FIG. 5 is representation of an entry in the L1 cache directory. It contains a line ID A corresponding to Field A in FIG. 3, and a use bit indicating if the line ever been used since the last time it was brought into L1 from L2.

Figure 6:
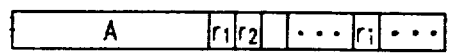
FIG. 6 is a diagram of an entry in the L2 cache directory.

FIG. 6 is the representation of an entry in the L2 cache. It contains a block ID A' corresponding to Field A' in FIG. 4, and a r-bit (replacement bit) for each line in the block indicating if the line was ever been loaded to L1 and subsequently replaced. The detailed operations of the cooperative L1 and L2 caches is described below with reference to FIGS. 7 and 8.

Figure 7:
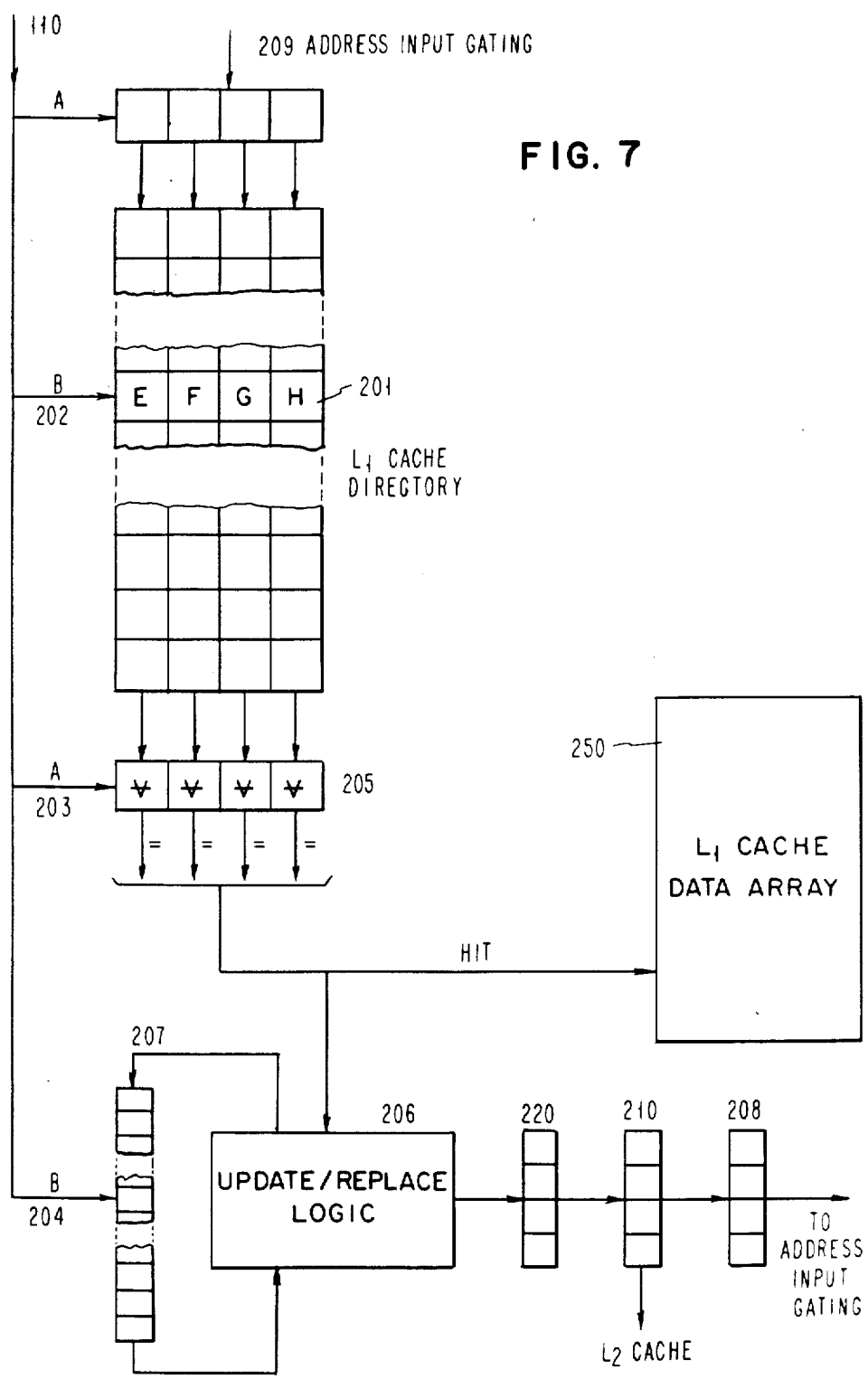
FIG. 7 is a block diagram of a L1 cache with an interface to the L2 cache.

Refer now to FIG. 7 which is a detailed block diagram representation of the L1 cache directory 201 in L1 cache 200 (FIG. 2), the new interface 210 to the L2 cache, and confirmation logic 220 for prefetched lines. The system shown is a typical 4-way set associative cache, the Directory 201 and Update/Replace Array and Control Logic and the Data Array 250 of the L1 cache itself. The cache Directory 201 includes an Address Input network 209, and an Address Compare Logic 205. The Update/Replace Array is comprised of a Replacement Array 207, Update/Replace Logic 206, Confirmation Logic 220, Interface 210 to L2 cache on replacement of lines, and Address Gating Logic 208.

The address of a memory access on the bus 110 from the processor 100 is used to address the directory and the replacement array according to Fields A and B described in FIG. 3. Line ID A is provided to the address input gating network 209 and the address compare logic 205. CC address B is provided at 202 to the directory 201 to select which CC of line IDs is to be compared. First, the entries E, F, G and H in the CC pointed to by B are simultaneously read out to the compare logic 205 to compare with A. The access generates a line hit if one of them compares. Dependent on the access types: a fetch or a store, the data array 250 acts accordingly. If none of the lines compare, on a fetch, a line miss is generated and a load request of the accessed line is sent to the L2 cache. On a store miss, the data to be changed is simply sent down to the L2 cache.

A description of the Least-Recently-Used (LRU) replacement logic in 206 and 207 is set forth in U.S. Pat. No. 4,008,460 which is assigned to the assignee of the present invention, therefore a detailed description of its operation is not required. The update logic 206 reads the current replacement status 207 of the lines in the CC pointed to by Field B at 204. If the access is a hit to the cache, the confirmation logic 220 turns on the use bit in the line entry for A if this is the first time A is used since it was brought into the cache. If line A is missing, the status indicates which line is to be replaced to make space for A, and the interface 210 checks the use bit of the line to be replaced. If it is used, the line ID is sent to the L2 cache so that the L2 can update its r-bit. Otherwise, if the replaced line has never been used before, no special access request is made to L2 at the interface 210. The updated line IDs in the CCs are stored in the address gating network 208. The new entry for line A with its use bit on is stored in the address gating network 208 to be sent to the address input gating network 209 to finally update the cache directory. Whether line A is missing or not, the replacement array is updated such that A is currently the most-recently-used line in the CC.

Figure 8:
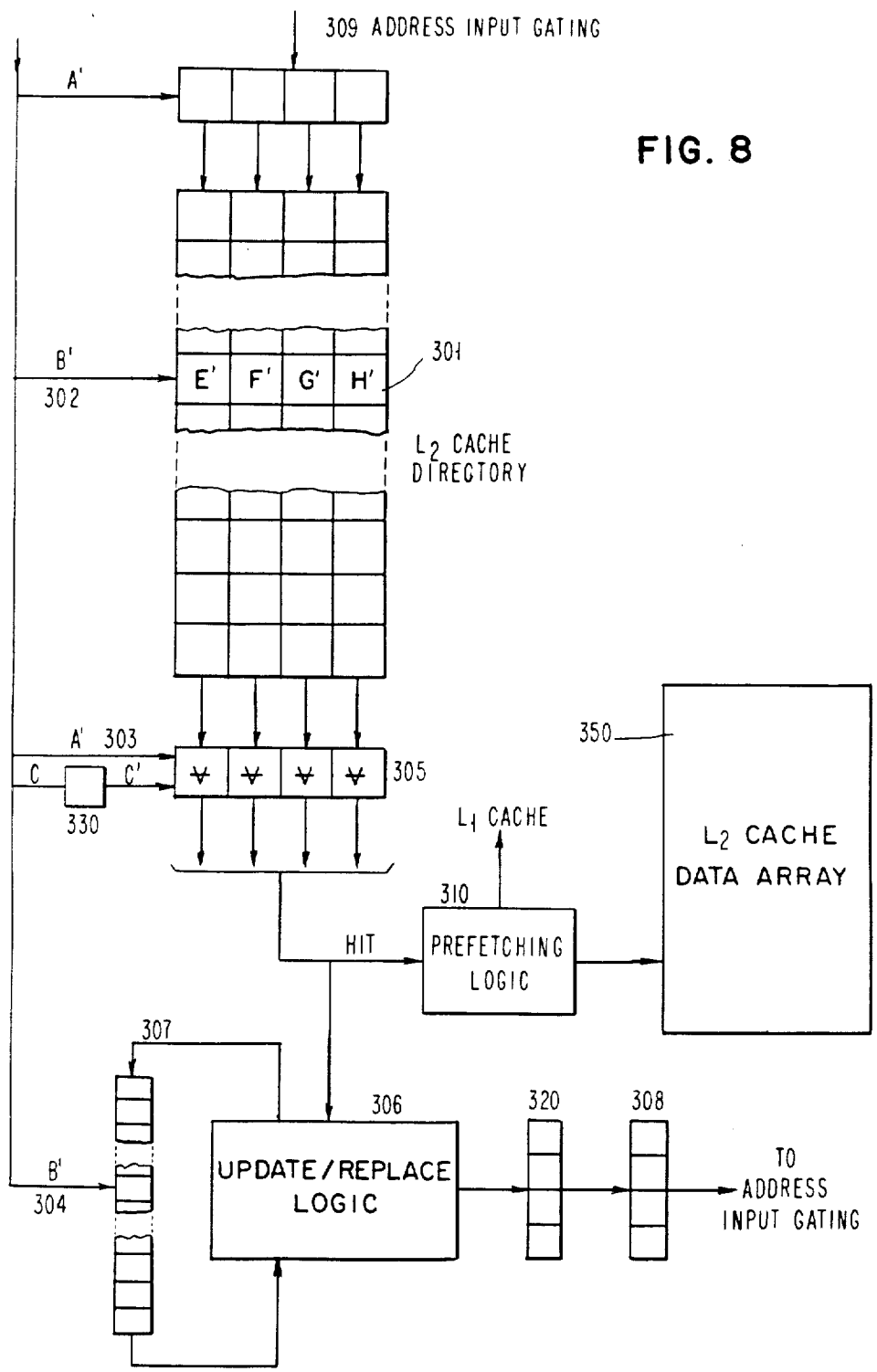
FIG. 8 is a block diagram of a L2 cache with an interface to the L1 cache.

Refer now to FIG. 8 which sets forth the L2 cache organization in the present invention. The major components are similar to those in the L1 cache directory in FIG. 7, except for r-bit Update Logic 320 and prefetching mechanism 310. According to FIG. 6, an entry in the L2 cache directory is comprised of a block ID and a r-bit of each line in the block. For a L2 cache access resulting from a L1 miss, all the block IDs in the CC pointed to by Field B' at 302 are simultaneously read out to compare with Field A' at the Address Compare Logic 305. If block A' is in the CC, all the r-bits in A' are checked at the prefetching logic 310. Logic 310 orders the data array 350 to load those lines with the r-bits on and the missed line, to the L1 cache. At the same time the L1 cache directory is signalled to update which lines are being prefetched. This contributes special requests to the L1 cache such that only the directory is updated and the confirmation logic 220 in FIG. 7 will not turn on the use bit for each of these prefetched lines. If no block ID in the CC compares, a block miss is generated and the result is sent to the update/replace logic 306. The Update/Replace logic, once activated, reads the current replacement status of the CC pointed to by Field B' and replaces the least-recently-used block ID indicated by the replacement status and stores the newly used block A' in the address gating network 308. In both cases above, the r-bit Update Logic 220 turns off all the r-bits in A'.

The replacement of a L1 line which has been used causes a special L2 access and only the L2 directory 301 is involved. If the block containing the replaced line is in the L2 cache, its r-bit is turned on at the r-bit update logic network 220 and the updated entry is cycled back to the L2 directory networks thru 308 and 309. In this case the line position in the block is obtained by performing a power of 2 computation. The line indicator 330 takes the line number C and converts it into the line position C' in the block. For example, for the third line of a block, C='010' and C'='00000100'.

The present invention teaches 'how' to prefetch data from L2 to L1. There are some assumptions made in the above description. Assumptions such as 'when' to prefetch, 'where' to put prefetched data in L1, and how to maintain high prefetching accuracy. In the above description it was assumed that the prefetch mechanism is activated on a L1 miss, prefetched data is placed at the most-recently-used status of the CC in L1, and the accuracy is maintained by not turning the r-bit on in L2 when a prefetched, but never used, line is to be replaced from L1. Assumptions other than the above are also feasible with the present invention.

In summary, a scheme of fetching the storage units from one level of storage (L2) to another level of storage (L1), in a memory hierarchy of a data processing system, has been described. The scheme is based on the replacement history of L1 sub-blocks in L2 blocks and is depicted in this invention by assuming that the L1 and L2 are two different levels of caches with minor changes of logic. Compared to a traditional memory hierarchy, which is based on a demand basis, the described scheme makes better use of L1 storage and significantly reduces the memory access time of the CPU in any data processing system.

INDUSTRIAL APPLICABILITY

It is an object of the invention to provide an improved prefetching mechanism for a data processing system.

It is another object of the invention to provide an improved prefetching mechanism in a data processing system which has a memory hierarchy which includes at least two levels of storage.

It is yet another object of the invention to provide an improved prefetching mechanism in a data processing system which has a memory hierarchy which includes at least two levels of storage, with L1 being a high-speed low-capacity memory, and L2 being a low-speed high-capacity memory, with the units of L2 and L1 being blocks and sub-blocks respectively, with each block containing several sub-blocks in consecutive addresses. Each sub-block is provided with an additional bit called an r-bit, which indicates that the sub-block has been previously stored in L1. When the sequence of CPU references to sub-blocks not present in L1 tends to repeat, the prefetching of sub-blocks that have their r-bits set, results in a higher hit ratio.

Having described our invention, what we claim as new, and desire to secure by Letters Patent is:

1. In a computing system including at least one processor operative with at least two levels of memory hierarchy comprised of a high-speed low capacity first level of memory (L1), and a low-speed high-capacity second level of memory (L2), said L2 memory storing blocks of data having a plurality of sub-blocks, and said L1 memory storing sub-blocks of data, the improvement comprising:

each of said sub-blocks stored in said L2 memory having a replacement bit indicative that said sub-block has been previously stored in said L1 memory and is no longer in said L1 memory when said replacement bit is in one state, and had not been previously stored in said L1 memory when said replacement bit is in an opposite state; and means for prefetching from said L2 memory to said L1 memory all sub-blocks in a given block that have their replacement bit in said one state, said sub-blocks being randomly located in said given block following said at least one processor referencing a predetermined sub-block in said L1 memory, said predetermined sub-block being included in said given block, and said sub-block not being present in said L1 memory and has to be fetched from said L2 memory to said L1 memory.

2. The combination claimed in claim 1, wherein said two levels of memory hierarchy comprise a main memory at L1 and a DASD at L2.

3. The combination claimed in claim 1, wherein said two levels of memory hierarchy comprise a main memory at L1 and a magnetic drum at L2.

4. The combination claimed in claim 1, wherein said two levels of memory hierarchy comprise a cache at L1 and a main memory at L2.

5. The combination claimed in claim 1, wherein said at least two levels of memory comprise a three level memory hierarchy with a level 1 cache at L1, a level 2 cache at L2 and a main memory at level 3 (L3).

6. A method of operating a computing system comprised of at least one processor operative with at least two levels of memory hierarchy comprised of a high-speed low-capacity first level of memory (L1), and a low-speed high-capacity second level of memory (L27), said L2 memory storing blocks of data having a plurality of sub-blocks, and said L1 memory storing sub-blocks of data, wherein each sub-block of data includes a replacement bit indicative that the sub-block has been previously stored in L1 and is no longer said L1 memory when the bit is in one state, and had not been previously stored in said L1 memory when in the opposite state, said method comprising the steps of:

interrogating said L1 memory by said at least one processor, to access a given sub-block of data, and if said given sub-block is stored therein, accessing same; and interrogating said L2 memory by said at least one processor, to access said given sub-block of data, if said sub-block is not stored in said L1 memory, and if said given sub-block is stored in said L2 memory, transferring same to said L1 memory, and prefetching from said L2 memory to said L1 memory all other sub-blocks, in the same block of data as said given sub-block, that have their replacement bit in said one state indicative of previously having been stored in said L1 memory, said sub-blocks being randomly located in said given block.

7. The method claimed in claim 6, wherein said two levels of memory hierarchy comprise a main memory at L1 and a DASD at L2.

8. The method claimed in claim 6, wherein said two levels of memory hierarchy comprise a main memory at L1 and a magnetic drum at L2.

9. The method claimed in claim 6, wherein said two levels of memory hierarchy comprise a cache at L1 and a main memory at L2.

10. The method claimed in claim 6, wherein said at least two levels of memory hierarchy comprise a three level memory hierarchy with a level 1 cache at L1, a level 2 cache at L2 and a main memory at level 3 (L3).

* * * * *